Oct. 29, 1968     H. BEUSCHEL     3,407,736
INTERNAL BURNER SOLID FUEL PROPELLANT CHARGE FOR ROCKET ENGINES
Filed June 15, 1966     3 Sheets-Sheet 1
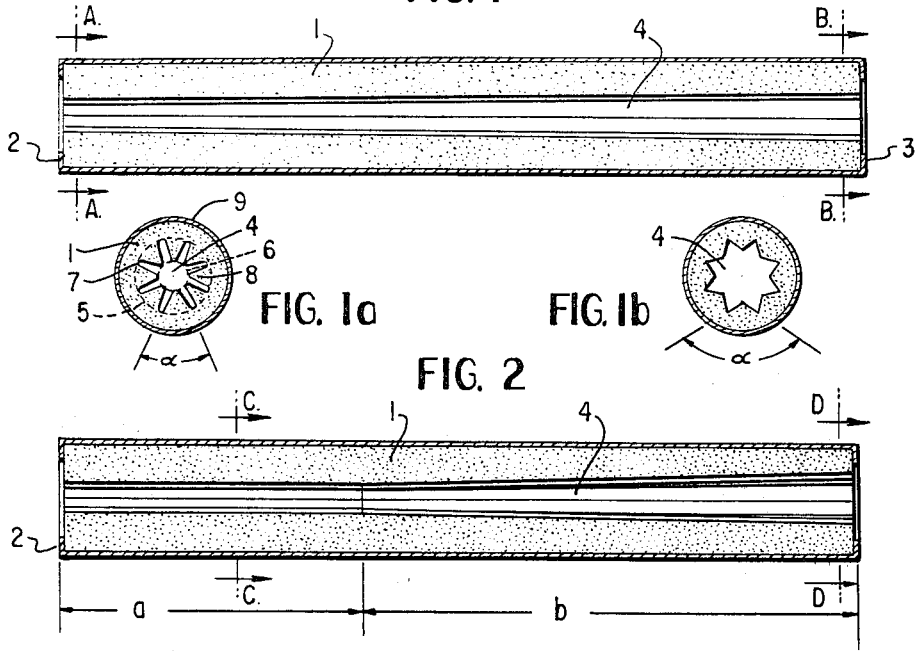
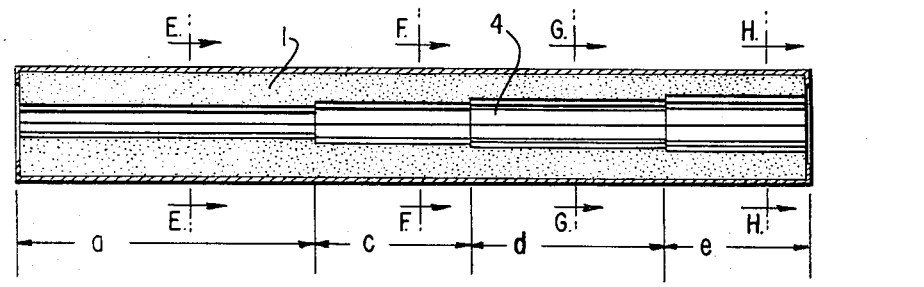
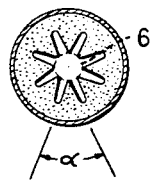 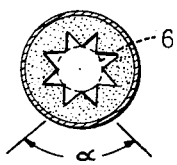 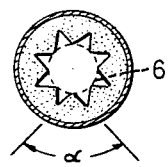 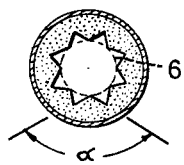
INVENTOR
HELMUT BEUSCHEL

INVENTOR.
HELMUT BEUSCHEL

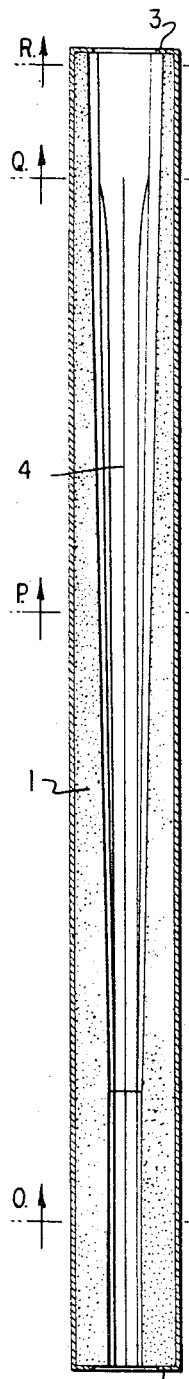
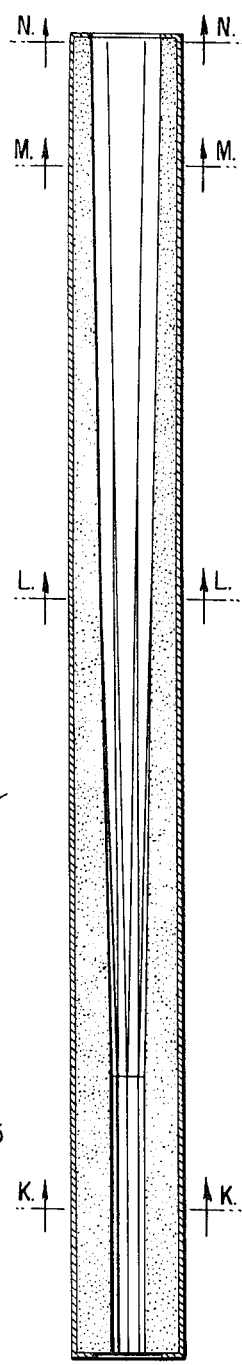
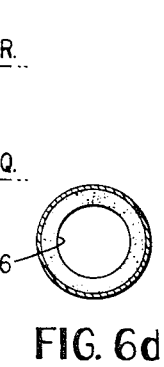
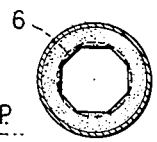
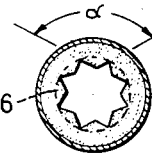
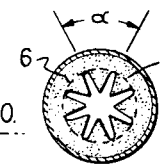
FIG. 6d
FIG. 6c
FIG. 6b
FIG. 6a
FIG. 6
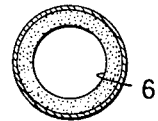
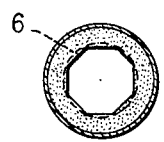
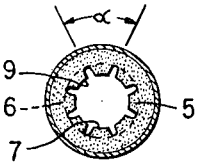
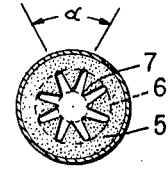
FIG. 5d
FIG. 5c
FIG. 5b
FIG. 5a
FIG. 5
INVENTOR
HELMUT BEUSCHEL United States Patent Office 3,407,736
Patented Oct. 29, 1968

3,407,736
INTERNAL BURNER SOLID FUEL PROPELLANT CHARGE FOR ROCKET ENGINES
Helmut Beuschel, Steyerberg, Germany, assignor to Dynamit Nobel Aktiengesellschaft, Troisdorf, Germany
Filed June 15, 1966, Ser. No. 557,698
Claims priority, application Germany, June 16, 1965, D 47,515, D 47,516
13 Claims. (Cl. 102—99)

ABSTRACT OF THE DISCLOSURE

An internal burner propellant charge having a star-shaped profile cross-section, hereinafter referred to as a star-internal burner, having an internal cross-sectional area increasing toward the nozzle end and a constant diameter circumscribing circle; the angle and base width of the star points is maintained constant throughout the length of the charge and the height of the star points progressively decreases along plane surfaces inclined to the axis of the propellant charge and tagent to the circle inscribing the inside profile cross-section. The height may decrease until a polygonal cross-section or a circular cross-section is formed at the nozzle end. A conically tapered charge may be axially adjoined to a constant internal diameter charge.

Background of the invention

Despite the relatively complicated prior art charge geometry, the star-internal burner is the most widely used type of radial burner propulsion unit because of the many advantages gained from the specific structure. The design considerations of desirable thrust and favorable consumption characteristics are determined to a large extent by the dimensioning and configuration of the internal star profile of the solid propellant charge. It is of prime importance to eliminate internal jamming by providing a proper ratio between the burning propellant charge surface and the inside star cross section on the nozzle side. This internal jamming can be expressed as the K-ratio, i.e., constriction ratio, which is the ratio of the burning surface to the throat diameter of the nozzle.

For optimum design, there must be a favorable K-ratio for the particular type of propellant used. Safety is also of prime importance; to avoid the danger of an exploding rocket, the K-ratio must not exceed a specific value that is the maximum permissible value for the particular type of propellant fuel.

The above design considerations may be satisfied with a star-internal burner having a constant inside star profile over its entire length; however, there is only a single value for the maximum length of the propellant charge, because of the maximum permissible K-ratio. In the design of propulsion units, there is usually a predetermined desired value for the thrust, combustion period, and maximum cross-sectional area. A constant cross-section star-internal burner could be used in only the rarest of instances. Usually, the maximum value for the K-ratio is exceeded before the length of the propellant is extended far enough to accommodate all of the desired fuel.

The most favorable conditions have been achieved by means of the prior art star-internal burner having an inside start-cross section that widens conically toward the nozzle. In the prior art devices, the star-shaped inside cross-section is maintained with a constant diameter circle circumscribing the star shape, and a gradually increasing diameter for the circle inscribing the star shape and the angle of the star points. The conically widening star-internal burner has the advantage that the internal cross-sectional area increases toward the nozzle to accommodate the increased gas flow toward the nozzle. Thus, it is possible to increase the consumption and thrust of a propellant charge without exceeding the maximum value of the K-ratio, in comparison to a star-internal burner of constant profile. Also, a greater length and quantity of fuel may be employed.

A prior art alternative to the conically widening star-internal burner is a star-internal burner having a series arrangement of constant profile portions increasing in diameter in a step-like manner toward the nozzle. Each portion will be designed for the maximum value for the K-ratio. This structure is desirable, because of its economy of manufacture. This step-like increase in cross-sectional area towards the nozzle closely approximates a conical construction without having the usual difficulty in manufacturing the conical cross-section. In the prior art conical star-internal burner, the surfaces forming the points of the star are twisted from end to end, because the angle of the star points progressively increases toward the nozzle. This presents considerable difficulty in constructing a mandrel to be used in forming the internal star profile. The step-like construction has the advantage that each portion has a constant profile, that is, the angle of the points is the same throughout the length of each portion. However, the step-like profile has the disadvantage that it will accommodate less fuel than a conical profile propellant charge having the same external dimensions.

Summary of the invention

It is an object of the present invention to provide a star-internal burner having a configuration that will have the above-mentioned advantages without the above-mentioned disadvantages. More particularly, it is an object of the present invention to provide a star-internal burner having a configuration that can be easily and economically constructed with conventional machinery, and that will contain a maximum amount of fuel for predetermined external dimensions and a predetermined maximum K-ratio.

The present invention eliminates the twisted flank portions of the star points to allow the simple manufacture of the profile mandrel. Also, the burner of the present invention will have the advantage of being capable of containing a relatively large amount of propellant without exceeding the maximum K-ratio. The present invention employs a star-shaped profile having an internal cross-sectional area increasing toward the nozzle end and a constant diameter circumscribing circle; with this arrangement, the angle and base width of the star points is maintained constant throughout the length of the charge and the height of the star points is progressively decreased along plane surfaces conically inclined to the axis of the propellant charge and tangent to the circle inscribing the inside profile cross-section. According to another feature of the present invention, the conical widening of the inside profile may be continued or extended until the star shape completely disappears, that is, until the plane surfaces defining the height of the star prongs overlap to produce an inside profile having the form of a polygon, with the number of polygonal sides corresponding to the number of star points. Also, the conical widening of the internal profile may be continued or extended until the plane surfaces are tangent to the circle circumscribing the star-shaped profile, whereby the internal configuration will be that of a circle identical to the circumscribing circle.

The conical widening of the internal cross-sectional area of the star-shaped profile according to the present invention has the same advantages of increased fuel quantity, thrust, and consumption that have been mentioned above in regard to the conventional conically increasing internal cross-sectional area burners having twisted surfaces defining the star points. However, the disadvantages incurred in the manufacture of the prior art burners is avoided in the present invention.

It is contemplated that many different specific star-shapes and number of star points may be used in a star-internal burner according to the present invention. Also, it is contemplated that a conical section according to the present invention may be combined with a section having a constant cross-sectional area; the two sections would be matched according to known principles.

*Brief description of the drawing*

Further objects, features, and advantages of the present invention will appear from the following description in connection with the accompanying drawing, in which:

FIGURE 1 is an axial cross-secional view taken through a prior art star-internal burner having an internal cross-sectional area that widens conically towards the nozzle of the propellant charge;

FIGURE 1a is a cross-sectional view taken on line A—A of FIGURE 1;

FIGURE 1b is a cross-sectional view taken on line B—B of FIGURE 1;

FIGURE 2 is an axial cross-sectional view, similar to FIGURE 1, taken through another prior art star-internal burner, which is provided with a constant cross-sectional area section and a conically widening cross-sectional area section serially arranged;

FIGURE 2a is a cross-sectional view taken on line C—C of FIGURE 2;

FIGURE 2b is a cross-sectional view taken on line D—D of FIGURE 2;

FIGURE 3 is an axial cross-sectional view, similar to FIGURES 1 and 2 taken through a third prior art star-internal burner having a plurality of series connected portions with a constant internal star profile, with the diameter of the portions increasing in a step-like manner toward the nozzle end of the propellant charge;

FIGURES 3a, 3b, 3c and 3d are cross-sectional views taken on lines E—E, F—F, G—G and H—H respectively, of FIGURE 3;

FIGURE 5 is an axial cross-sectional view of another embodiment of the present invention, similar to the embodiment of FIGURE 4;

FIGURES 5a, 5b, 5c, and 5d are cross-sectional views taken on lines K—K, L—L, M—M, and N—N, respectively, of FIGURE 5;

FIGURE 6 is an axial cross-sectional view taken through still another embodiment of the present invention, wherein the angles of the star points vary between the constant cross-sectional area portion and the conically widening cross-sectional area portion;

FIGURES 6a, 6b, 6c, and 6d are cross-sectional views taken on lines O—O, P—P, Q—Q and R—R, respectively, of FIGURE 6;

*Detailed description of the drawing*

Figure 4:
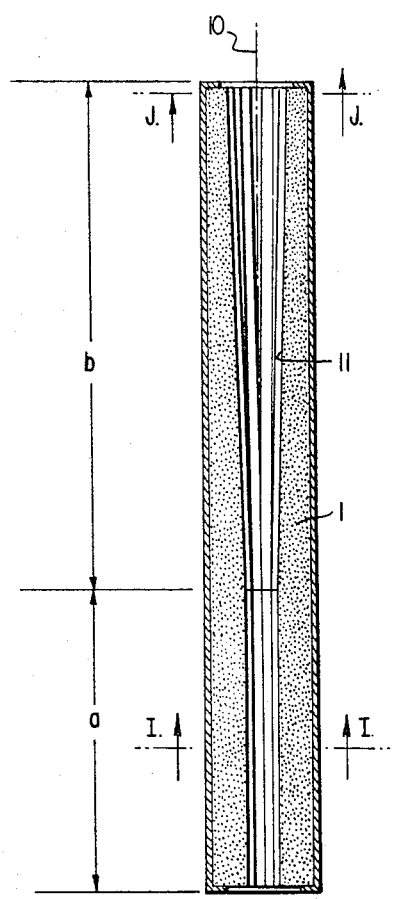
FIGURE 4 is an axial cross-sectional view taken through one embodiment of the propellant charge according to the present invention, with a first portion of constant inside cross-sectional area and a serially arranged second portion having a conically widening inside cross-sectional area toward the nozzle end.
Figure 4A:
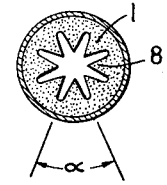
FIGURES 4a and 4b are cross-sectional views, taken along lines I—I and J—J, respectively, of FIGURE 4.

In the embodiment of FIGURE 1, the solid fuel propellant charge 1 is provided with a constant external diameter and an internal cross section 4 that widens conically from the forward end 2 toward the nozzle end 3. As shown in FIGURES 1a and 1b, the cross-section 4 has a star shape circumscribed by the circle 5; the circle 5 is of constant diameter throughout the length of the propellant charge 1. The circle 6 inscribes the star-shaped profile and increases in diameter toward the nozzle end 3. The angle $\alpha$ between the surfaces forming the star points continuously increases from the forward end 2 to the nozzle end 3; this is seen from a comparison between FIGURES 1a and 1b. Thus, as a result of the increasing angle $\alpha$, the flank portion 7 of the star points 8 are represented by twisted plane surfaces. The propellant charge 1 is enclosed by a conventional insulated container 9.

In the device of FIGURE 2, the solid fuel propellant charge 1 has a constant external diameter throughout its entire length. Starting from the forward end 2, there is a portion *a* having a constant internal star-shaped profile. Portion *a* is connected in series with a portion *b*, which extends to the nozzle end and has a internal star-shape profile that conically increases in area in the same manner as the star shaped profile of FIGURE 1. The circle circumscribing the star-shaped profile is of a constant diameter throughout the entire length of the propellant charge 1, including both portions *a* and *b*. The length of portion *a* is provided so that the K-ratio is slightly smaller than the maximum K-ratio for the particular type of propellant; the configuration of the portion *b* is determined so that the K-ratio of portion *a* will be maintained. The increase in the star point angle is evident from a comparison of FIGURES 2a and 2b.

In the prior art device of FIGURE 3, the solid fuel propellant charge 1 is divided into four sections *a, c, d,* and *e*. Section *a* of FIGURE 3 is identical to section *a* of FIGURE 2. Each of the sections has an internal cross-sectional star-shaped profile 4. The circle circumscribing the star-shaped profile remains constant in diameter throughout the entire length of the propellant charge 1. The circle inscribing the star-shaped profile and the angle of the star points is constant throughout the entire length of each of the sections *a, c, d,* and *e*. From a comparison of FIGURES 3a, 3b, 3c, and 3d, it is seen that the circles 6 inscribing the star-shaped profile increase in a step-like fashion progressively from section *a* through section *e*; the angles increase in a similar step-like manner toward the nozzle end.

The external dimensions are identical in each of the propellant charges 1 of FIGURES 1, 2, and 3. From a comparison of FIGURES 1a, 2a, and 3a, it is seen that the propellant charges 1 of FIGURES 1, 2 and 3 have the same internal star-shaped profile at their forward end. From a comparison of FIGURES 1b, 2b, and 3d, it is seen that in each of the embodiments of FIGURES 1, 2 and 3 the star-shaped profile at the nozzle end of the charge 1 is the same. The amount of fuel that can be accommodated in the container 9 is the largest in the embodiment of FIGURE 2.

Figure 4B:
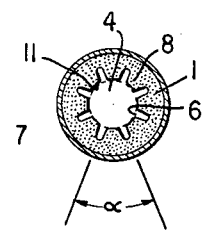

The star-internal burner according to the present invention as shown in FIGURE 4, has the same external dimensions as the embodiment of FIGURE 2. The forward section *a* of the FIGURE 4 embodiment is identical to the forward section *a* of the FIGURE 2 embodiment. The circle circumscribing the star-shaped profile is of a constant diameter throughout the length of the solid fuel propellant charge 1 of FIGURE 4. However, in contrast to the embodiment of FIGURE 2, the angle $\alpha$ of the start points 8 remain constant throughout the entire length of the charge 1. The generally conical widening of the star-shaped profile toward the nozzle end is attained by a continuous uniform decrease of the height of the star points 8 along the plane surfaces 11; the plane surfaces 11 being conically inclined with respect to the axis 10 of the propellant charge 1, when viewed in cross section as shown in FIGURE 4. The plane surfaces 11 are tangent to the circle 6 that inscribes the star-shaped profile 4. Therefore, the flanks 7 of the star points 8 are defined by plane surfaces that are not twisted; this is in contrast to the twisted flanks of the prior art FIGURE 2 device. As a result, the profile mandrel used to produce the internal star-shaped profile of the propellant charge 1 can be manufactured in a relatively simple and economical manner. By comparison of the propellant cross-sectional area of FIGURES 4b and 1b, it is seen that the embodiment of FIGURE 4 contains the same or more fuel than is accommodated in the prior art charge of FIGURE 1.

In the embodiment of the present invention according to FIGURE 5, the forward portion of the propellant charge up to the line L—L is identical to the propellant charge 1 of FIGURE 4. However, the propellant charge of FIGURE 5 has been extended from line L—L to the nozzle end at line N—N. The surfaces 11 forming the conical widening of the cross-sectional shape are extended from the line L—L to the line M—M, where as indicated in FIGURE 5c, the internal configuration of the propellant charge is that of a polygon having sides corresponding in number to the points of the star-shaped profile of FIGURES 5b and 5a. A continuation of the conical widening, while maintaining the constant diameter circumscribing circle 6, will produce a circular profile at line N—N, which is identical in diameter to the circle 6. The conical widening is continuous between lines L—L and N—N. The angle α of the star points remains constant throughout the length of the propellant charge in FIGURE 5.

In the embodiment of the present invention according to FIGURE 6, the solid fuel propellant charge 1 has a forward portion up to approximately the line P—P, that is identical to the propellant charge 1 of the prior art FIGURE 2 device. The charge 1 of FIGURE 6 has a star-shaped internal profile with a circumscribing circle 6 of constant diameter throughout the entire length of the charge. The conical widening of the inside cross-section 4 from the line P—P to the nozzle end 3, is obtained in exactly the same manner as in the case of the propellant charge 1 according to FIGURE 2, that is, by means of progressively increasing the star point angle α. However, in the FIGURE 2 device, the conical widening is extended only up to the cross-section indicated in FIGURE 2b, which corresponds to the cross-section indicated in FIGURE 6b; in contrast to this, the conical widening of the propellant charge 1 according to FIGURE 6 is continued by constantly and uniformly increasing the star point angle α until the star points have completely disappeared to form an inside profile according to FIGURE 6c, which is an equilateral polygon having its corner points located on the circumscribing circle 6 and a number of sides corresponding to the number of star points. Between lines Q—Q and R—R, the profile is conically widened in a continuous manner to form a gradual transition from the polygonal shape to the circular shape of FIGURE 6d, which has a diameter equal to the diameter of the circumscribing circle 6.

In both the embodiments of FIGURES 5 and 6, a propellant charge internal configuration has been provided that will have the maximum amount of fuel to be accomodated within the fixed external dimension, while maintaining the permissible K-ratio corresponding to the type of fuel employed; the external dimensions, number of star points, and the initial burning surface being predetermined and fixed for purposes of comparison. Also, the embodiment of FIGURE 5 has the additional advantages of simplicity and economy in manufacture that cannot be attained with the embodiment of FIGURE 6, which contains the twisted surfaces defining the star points.

To obtain a proper propellant charge design, it is necessary that the constant inside cross sectional area portion of the charge be dimensioned so that the burning surface will be decreased during consumption, to the same extent that the burning surface of the conically widening portion of the charge is increased during consumption, if a constant thrust is desired. If a progressive or regressive thrust is desired, the constant cross-sectional portion and the conically widening cross-sectional portion must be coordinated in a corresponding different manner with respect to each other; this may be accomplished by changing the configuration of the star profile by varying the number and shape of the star points. In each case, the correct configuration and K-ratio may be determined mathematically. It is contemplated that the teachings of the present invention may be employed with star-shaped profiles having a different number of star points than are shown in the drawing.

It will be understood that the foregoing embodiments must be considered as examples of the broader aspects of the invention, and that further modifications and variations are contemplated within the spirit and scope of the invention as defined by the following claims.

I claim:

1. A star-internal burner solid fuel propellant charge having forward and nozzle ends for rocket engines, comprising; a solid fuel substantially tubular propellant charge having an internal star-shaped cross-section at its forward end widening conically toward the nozzle end; said star-shaped cross-section having a circumscribing circle of substantially constant diameter throughout substantially the entire length of said charge; the angle formed by and the base widths of the internally directed star points of said star-shaped cross section being substantially constant throughout substantially the entire length of said charge; and the height of said points decreasing continuously along surfaces substantially conically inclined with respect to the axis of the propellant charge.

2. The propellant charge of claim 1, wherein said surfaces extend within a plane tangent to the circle inscribing the inside profile of said star-shaped cross-section of the charge, when viewed in a transverse cross-section.

3. The propellant charge of claim 2, wherein the radial height of said inwardly directed star points of said star-shaped cross-section continuously decrease toward said nozzle end until the complete disappearance of said star points and the formation of an inside profile having the form of a polygon with sides corresponding to the number of and bases of said star points; the corner points of said polygon being on the circumscribing circle.

4. The propellant charge of claim 1, wherein the radial height of said inwardly directed star points continually decrease until the inside profile cross-section is in the form of a circle being coextensive with said circumscribing circle.

5. The propellant charge of claim 2, wherein the radial height of said inwardly directed star points continually decrease until the inside profile cross-section is in the form of a circle being coextensive with said circumscribing circle.

6. The propellant charge of claim 3, wherein the radial height of said inwardly directed star points continually decrease until the inside profile cross-section is in the form of a circle being coextensive with said circumscribing circle.

7. The propellant charge of claim 1, including a forward substantially tubular propellant charge section having a substantially identically shaped and sized inside star profile cross-section over substantially the entire length thereof; said forward section being axially adjacent and aligned with said first mentioned tubular propellant charge; a circule circumscribing the inside star profile cross-section of said forward propellant charge section and said first-mentioned tubular propellant charge being substantially equal diameter throughout substantially the entire length of the complete charge.

8. The propellant charge of claim 3, including a forward substantially tubular propellant charge section having a substantially identically shaped and sized inside star profile cross-section over substantially the entire length thereof; said forward section being axially adjacent and aligned with said first-mentioned tubular propellant charge; a circle circumscribing the inside star profile cross-section of said forward propellant charge section and said first-mentioned tubular propellant charge being substantially equal diameter throughout substantially the entire length of the complete charge.

9. The propellant charge of claim 4, including a forward substantially tubular propellant charge section having a substantially identically shaped and sized inside star profile cross-section over substantially the entire length thereof; said forward section being axially adjacent and aligned with said first-mentioned tubular propellant charge; a circle circumscribing the inside star profile cross-section of said forward propellant charge section and said first-mentioned tubular propellant charge being substantially equal diameter throughout substantially the entire length of the complete charge.

10. The propellant charge of claim 6, including a forward substantially tubular propellant charge section having a substantially identically shaped and sized inside star profile cross-section over substantially the entire length thereof; said forward section being axially adjacent and aligned with said first mentioned tubular propellant charge; a circle circumscribing the inside star profile cross-section of said forward propellant charge section and said first mentioned tubular propellant charge being substantially equal diameter throughout substantially the entire length of the complete charge.

11. A star-internal burner solid fuel propellant charge having forward and nozzle ends for rocket engines, comprising: a first substantially tubular propellant charge section having a substantially identically shaped and sized inside star-shaped profile cross-section over substantially the entire length thereof; an axially adjacent and axially aligned second substantially tubular propellant charge section having an inside star-shaped profile cross-section substantially conically widening toward the nozzle end thereof; the circle circumscribing the inside star-shaped profile cross-section of said first propellant charge section and said second propellant charge section being substantially equal diameter throughout substantially the entire length of said sections; the radial height of the inwardly directed star points of said star-shaped profile continuously decreasing in said second propellant charge section toward said nozzle end until the complete disappearance of said star points and the formation of an inside profile having the form of a polygon with sides corresponding to the number of the star points; and the corner points of said polygon being on the circumscribing circle.

12. The propellant charge of claim 11, wherein the radial height of said star points continually decreases until the inside profile cross-section is in the form of a circle being coextensive with said circumscribing circle.

13. The propellant charge of claim 12, wherein the radial height of said inwardly directed star points decrease continuously along the plane surfaces substantially conically inclined with respect to the axis of the propellant charge and being tangent to the circle inscribing the inside profile cross-section of said charge in a transverse cross-sectional view.

References Cited

UNITED STATES PATENTS 3,088,273   5/1963   Adelman et al. _____ 60—35.6

ROBERT F. STAHL, *Primary Examiner.*